United States Patent [19]

Wind

[11] 4,433,335
[45] Feb. 21, 1984

[54] LOCATING DEVICE

[75] Inventor: David W. Wind, Dartmouth, Canada

[73] Assignee: Her Majesty the Queen in right of Canada, as represented by Minister of National Defence of Her Majesty's Canadian Government, Ottawa, Canada

[21] Appl. No.: 909,398

[22] Filed: May 16, 1978

[30] Foreign Application Priority Data

May 31, 1977 [CA] Canada .................................. 279484

[51] Int. Cl.³ .............................................. G01S 3/02
[52] U.S. Cl. ..................................... 343/463; 343/453; 343/387
[58] Field of Search ............ 343/103, 112 R, 112 TC, 343/112 C, 463, 453, 387; 364/726

[56] References Cited

U.S. PATENT DOCUMENTS 3,493,970 2/1970 Knauth ................................. 343/103
4,112,430 9/1978 Ladstatter ........................ 343/100 R Primary Examiner—Theodore M. Blum
Attorney, Agent, or Firm—Stevens, Davis, Miller & Mosher

[57] ABSTRACT

A system for locating a transmitter in an unknown location comprising apparatus and the method of receiving transmitted signals from said transmitter at the separated locations, demodulating the transmitted signals, performing a Fourier transformation of each of the demodulated signals to represent them as complex functions of frequency, while performing a complex division of pairs of the signals represented as complex functions of frequency, to obtain signals represented by the phase differences between pairs of signals as functions of frequency, and determining from the difference in phase between pairs of signals as a function of frequency the time differences existing between the said pairs of functions. From these time differences the position of the origin of the transmitted signals are determined and displayed.

13 Claims, 5 Drawing Figures

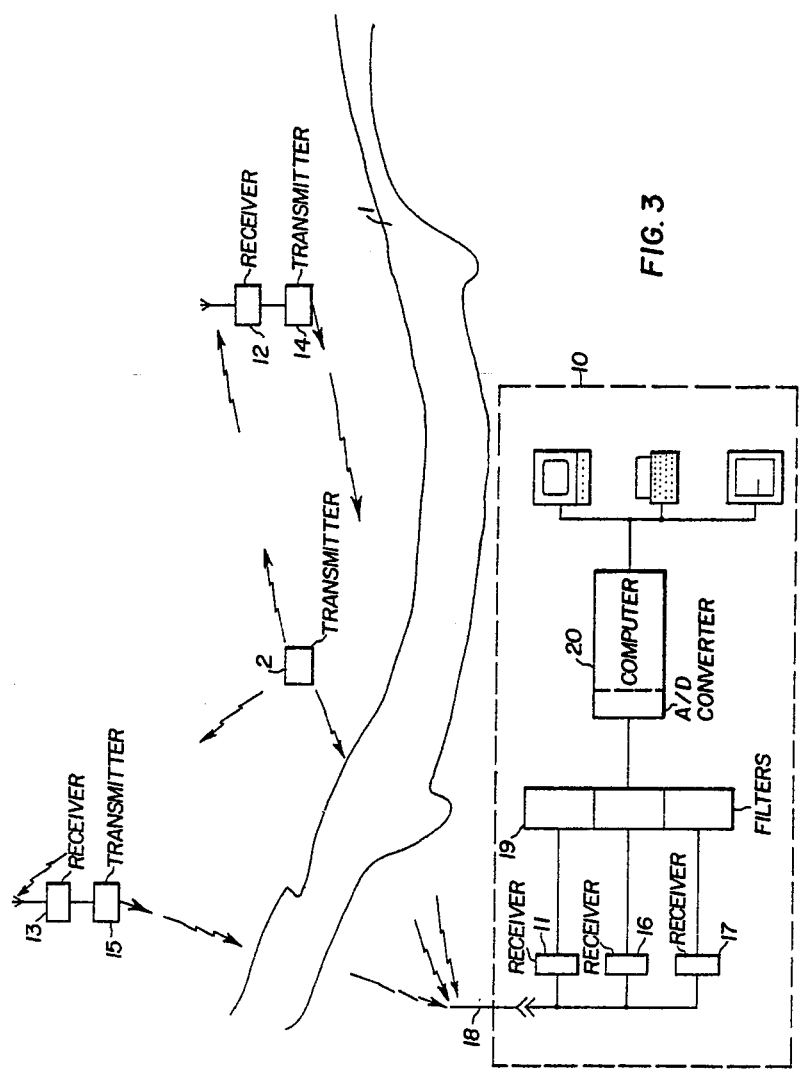

LOCATING DEVICE

This invention is an apparatus for determining the location of a transmitter, and is particularly useful for locating the transmitter in the presence of only brief periods of electromagnetic emission therefrom.

The accurate determination of the location of a transmitter has become an essential tactical tool of a law enforcement agency or of a military operation. Often the transmitter to be located emits only short bursts of electromagnetic energy, and often is itself mobile. Consequently a fast and highly mobile transmitter locating capability has become very important.

Typical prior art transmitter locating apparatus generally consists of a pair of stations each having directive antennas, which are turned to the direction of greatest amplitude of the received signal. Once the antennas have been oriented, knowing the distance between the two stations a triangulation calculation can be made, and the location of the transmitter to be found can be determined on a map.

However, this procedure suffers from a number of problems. The first problem is that in the case of nonflat terrain there is often shielding and refraction of the received signal by hills, resulting in amplitude maxima which are not in the direction of the transmitter to be located. In addition, other ground effect disturbances such as reflections from buildings in an urban area, metallic ores, etc., can cause substantial distortions in the direction of received signal maxima. Consequently it is often difficult to pinpoint the transmitter location with acceptable accuracy.

Furthermore, the transmitter to be located often will transmit only brief bursts of signal in an attempt to foil discovery. In this event, there is virtually no time to orient the receiving antenna and thus obtain the required bearing.

Consequently in such cases the aforenoted prior art technique either cannot locate the transmitter at all, or will determine a position of the transmitter which is displaced from its true position.

We have invented a system for detecting a transmitter which requires the receipt of only brief time periods of the transmitted signal. The precision of the accuracy of determination of the location is now heavily dependent upon the volume of information intercepted rather than the time of observation. Furthermore, the technique used does not depend on the orientation of a receiving antenna, which removes the previous requirement for a time period during which the receiving antenna is swung about to discern a maximum amplitude. Consequently simple omnidirectional vertical whip antennas can be used, which in itself provides a further advantage of aiding the mobility of the receiver station.

In the inventive system, a pair or pairs of spacially separate stations are interconnected via radio link, each station having an omnidirectional receiving antenna. At the separate stations, each received signal is translated in frequency and transmitted to a convenient location for the comparison of the received signals, such as at a control station. At the control station the signal from the transmitter to be found could also be similarly received, as well as the retransmitted signals. All signals received at the control station are demodulated, digitized and processed in a mini-computer to obtain the difference in time-of-arrival of the signal at pairs of receiving stations. The difference in time-of-arrival defines a hyperbolic surface of rotation about the axis defined by the line joining the location of the two receiving stations. This surface defines possible locations for the transmitter to be located. The intersection of several such surfaces or such surfaces with other a priori information defines the position of the transmitter.

The locations of the aforenoted stations relative to each other must be at least as precisely known as the precision with which transmitters are to be located (as is the case of the prior art triangulation system). However there is no requirement for precise orientation of the antennas, and simple omnidirectional antennas are sufficient for the system to function. Tests with the present inventive system have shown that it is not expected to be as critically disturbed by side effects which can produce the substantial location errors noted above with respect to the prior art triangulation system.

While the inventors do not claim that the time-of-arrival concept for determining the location of a station is new, what is claimed as new and inventive in the system structure in which the signals are processed. The concept of time-of-arrival location of a transmitter is described in the IEEE Transactions on Aerospace and Electronic Systems, Volume AES-8, No. 6, November 1972, and it is assumed that a person skilled in the art reading this specification is familiar with that publication, it being part of the general prior art.

In the present invention, however, only a small time sample of the received signal is required to accurately fix the location of the transmitter to be found, for instance 0.25 seconds for a signal representing the human voice. Clearly, with a simple whip omnidirectional antenna and with the receiving stations located in a mobile vehicle, with such a small required received sample of the transmitted signal, great tactical advantage may be obtained.

It has been found that the precision varies as the inverse of the square root of the observation time.

The inventive apparatus for determining the location of a transmitter, in general, is comprised of at least two spaced receivers for receiving electromagnetic radiation from the transmitter to be located, means for demodulating the radiation individually from each of the receivers, means for Fourier transforming the demodulated radiation and for providing a representation of a time slice of the demodulated radiation as a complex function of frequency. Means is also provided to separate the phase difference between pairs of the signals as a function of frequency.

The phase difference as a function of frequency is translated into a time difference between the signals received by the two receivers, which time difference is representative of the difference in distance of travel between the transmitter in question and each of the receiving stations. This difference in distance defines a hyperbolic surface of rotation about the line joining the two receivers.

With one or more further spaced receivers, comparing similarly the phase relationships between the demodulated signals therebetween or therefrom with one or both of the others, additional independent time differences will define other hyperbolic surfaces of rotation which will further limit the possible locations of the transmitter in question to the intersection points of the hyperbolic surfaces.

Since in a period as small as 0.25 second a substantial number of cycles of the carrier frequency emitted by the transmitter to be located have been emitted, there is a sufficient signal available for the determination of its phase characteristics. Precision can be improved, however, by processing of additional signal periods or slices and by averaging the results. A similar improvement can be made by extending the length of the time slice or by increasing the bandwidth if the transmitter is radiating frequencies in the region of the increased bandwidth.

A more detailed description of the invention will be found below, and the reader is directed to the following drawings, in which:

FIG. 3 is a plan view of an area of land showing the various stations in more detail.

FIG. 1 shows an area of land through which a river 1 runs. It is known that a transmitter 2 is present in the area, but its location must be determined.

Figure 1:
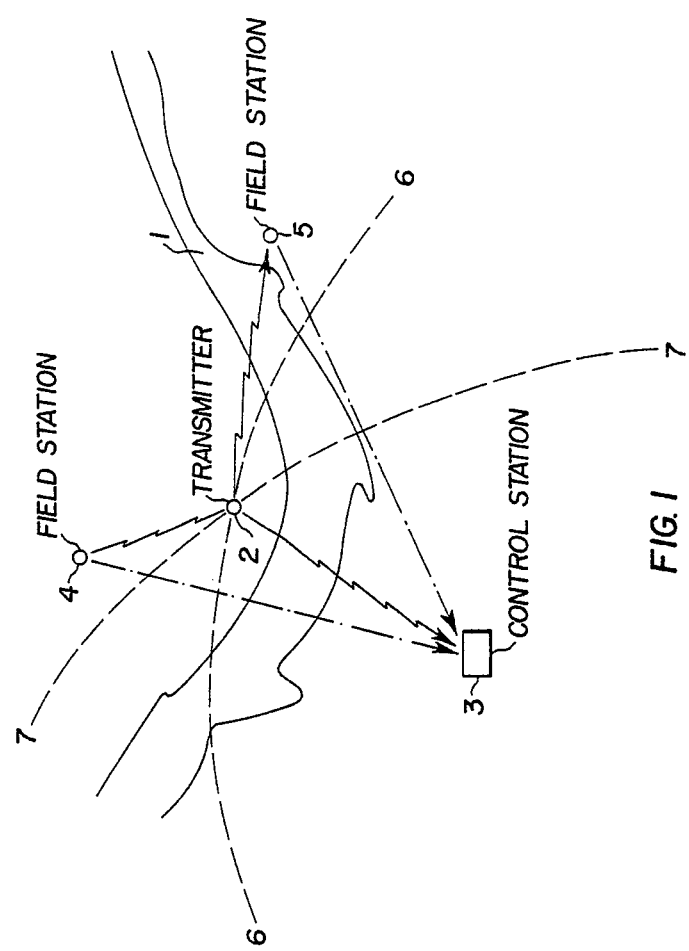
FIG. 1 is a plan view of an area of land showing locations of stations which might be used to locate a transmitter, when a priori information indicates the transmitter in question is on the surface of the earth.

A control station 3 is positioned in the area. Two remote field stations 4 and 5 are also positioned in the area, and their locations relative to each other and to the control station are determined accurately in a well known manner.

Upon emission of an electromagnetic signal such as a radio signal from transmitter 2, the emitter signal is received by the control station 3 as well as by field stations 4 and 5. The field stations translate the frequency of the signal and transmit the translated signal to control station 3. Accordingly, the control station receives a signal directly from unknown transmitter 2, as well as versions translated in frequency from field stations 4 and 5.

At the cntrol station, the signals from the field stations 4 and 5 and from unknown transmitter 2 are demodulated, and their phase differences determined. The difference in phase between the signal received by field station 4 and from transmitter 2 at control station 3 is evidence of a difference in time of receipt of the signal from transmitter 2, and defines the location of the unknown transmitter somewhere along the line of intersection of the hyperbolic surface of revolution and the surface of the earth defined by conic section 6—6, as described more fully in the aforenoted IEEE Transactions on Aerospace and Electronic Systems Publication.

A determination of the phase difference between the signals received by field station 5 and control station 3 is determinative in the same manner as noted above of the unknown transmitter being located on a line on the surface of the earth defined by conic section 7—7.

The intersection of lines 6—6 and 7—7 is the point at which the unknown transmitter is located.

Let us now consider the operation of the control station. As a result of demodulation in the control station of two signals there are provided two audio signal waveforms with a steady but small delay of the order of for example ten microseconds. The two signals can be considered as related by a transfer function which is associated with a partially known system.

In the present invention, one of the signals is considered to be the input and the other the output of the system with impulse response h(t). Since it is presumed that the signals are identical except for a time delay, then it is presumed that h(t) is a simple all-pass system introducing only a pure delay parameter.

In the present invention h(t), or the time delay, is calculated from the input and output wave forms. In this invention, the time difference is calculated by processing the input and output signals through means for performing a Fourier analysis thereon. This is done easiest by converting the input and output analog signals to digital signals, and carrying out the discrete Fourier transform in a minicomputer.

A complex division between the resulting signals provides a phase difference function $\Delta\theta_{ab}$. With a linear phase difference function of frequency representing a system with only a time delay between input and output, the partial derivative, $\partial\theta_{ab}/\partial\omega$, defines that time difference (where $\omega$ represents frequency).

Figure 2A:
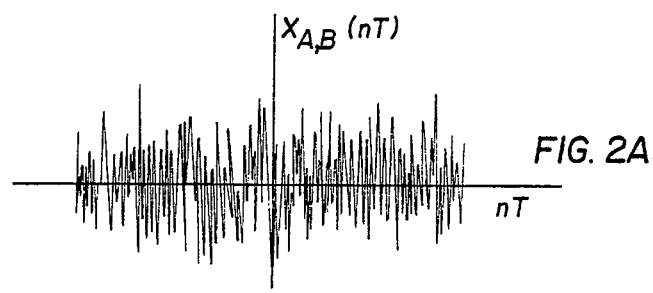
FIGS. 2a, 2b and 2c depict waveforms of the signals received from the transmitter to be located during three stages of processing.
Figure 2B:
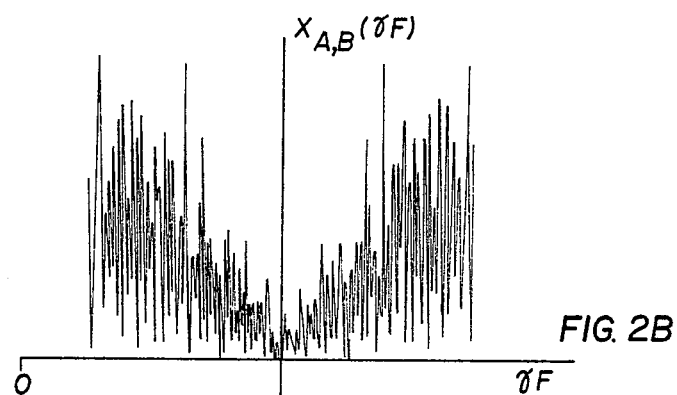
Figure 2C:
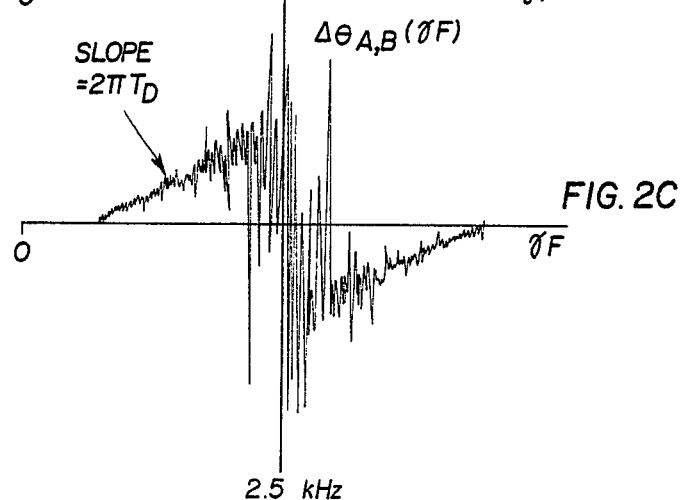

FIGS. 2a, 2b, and 2c depict the signals at various stages of processing. FIG. 2a shows the amplitude of a 200 millisecond sample of both of the demodulated (input and output) signals. It should be kept in mind that the concept of input and output signals is merely a designation given for the two received signals which are spaced apart in time according to some predetermined phase shift. The signals depicted are identical, except for the aforenoted slight shift in the time axis due to the path delay. The delay is imperceptible on the scale of FIG. 2a.

In this invention, the two signals are operated upon by a discrete Fourier transform, to produce a representation of the signal partially depicted in FIG. 2b. FIG. 2b shows a graph of magntidue of the complex transformed function of time as a function of frequency. The phase as a function of frequency is completely random. The central line is, in the preferred embodiment, at about 2,500 Hertz. The scale on the horizontal is broken. Frequency is represented by $OH_2$ to, +2500 Hz, −2500 Hz, $OH_z$ from left to right along the horizontal.

The signal depicted to the left hand side of the 2,500 Hertz point depicts the real amplitude as a function of frequency, and the mirror image on the right is the negative frequency portion of the transform.

FIG. 2c depicts the phase difference characteristic of the two signals which is derived from the Fourier transform and complex division operations. The slope of the figure to the left of the ±2,500 Hertz line is the delay between the two signals in question exemplified by FIG. 2a. The signals are identical in all respects except for their phase. This difference is illustrated in FIG. 2c.

The complex division operation, performed by this invention yields the phase characteristic, $\Delta\theta$, as shown in FIG. 2c with a slope proportional to the time difference of arrival of the two signals at the respective receivers. A least mean square fit, plus amplitude weighing factors have been used to estimate the value of the slope and establish a predicted time difference. The time difference is of course then used to establish the conic section curve noted above with respect to FIG. 1.

In practice the received signal is always corrupted with noise. However it is not a difficult further step to examine portions of the linear function shown in FIG. 2c selected on the basis of best signal to noise ratio and to apply a sum of least squares fit to obtain an estimate of the slope. Noise reduction circuitry could also be used. Furthermore, additional signal portions and/or longer periods of signal reception can be used to reverse the deterioration in precision due to a noisy signal. In this manner a locating system can strive to maintain a predetermined degree of precision.

Where time differences between pairs of voice band signals can be determined to sub-microsecond precision, the position fixes of the unknown transmitter can be theoretically obtained to the order of 100 meters or less. In a recent field trial in which two fixed stations were deployed at distances of about 6 kilometers from the control station, a land mobile target transmitter was tracked over a distance of 3 to 4 kilometers. The transmitter was located at points along a line about 200 meters from the actual path of the target transmitter.

FIG. 3 is a more detailed plan view in block form of the invention in an area described with reference to FIG. 1. A transmitter 2 which is to be located emits electromagnetic energy at a particular frequency. A central station 10 contains at least 3 receivers, 11, 16 and 17. First receiver 11 is tuned to the frequency of transmitter 2 which is to be located.

Two field stations are provided, each of which contains a receiver. These receivers, 12 and 13, are tuned to the frequency of transmitter 2. Receivers 12 and 13 translate the frequency of the signal received from transmitter 2, and each applies the translated signal to respective transmitters 14 and 15 which retransmits the signals. The amount of translation at each field station being different results in radiated frequencies different from each other, and different from that of transmitter 2.

At the central station 10 second and third receivers 16 and 17 are respectively tuned to the frequency of transmitters 14 and 15. The three receivers 11, 16 and 17 may all be connected to a single omnidirectional whip antenna 18 located at central station 10.

In operation of the structure so far described, the emitted electromagnetic energy of transmitter 2 is received by receiver 11 at the central station and by receivers 12 and 13 at the field stations. At the field stations the received signals are translated in frequency and retransmitted at different frequencies by means of transmitters 14 and 15. Receivers 16 and 17 receive the signals from transmitters 14 and 15.

This invention has been successfully fabricated using type SR250 or RA329 receivers as receivers 11, 12, and 13, and type R442 receiver as receivers 16 and 17. Transmitter types RT524 have been used as transmitters 14 and 15.

It is essential to insure that phase fidelity is not compromised by the system; otherwise there would be a non-linear phase shift with frequency through the band pass thereof and the assumption of a system introducing only time delay would be invalid. Off-tuning a conventional receiver by several kilohertz may cause system errors of several tens of microseconds which would produce positional errors ten kilometers or more. Appropriate IF filter design and high stability of the intercepter receiver should be utilized.

The fact that the phase difference characteristic for known geometrics can be predicted allows a unique opportunity for restoring the phase fidelity of conventional receivers in the computer. Using a calibration transmitter of known location and frequency and the locating system as described previously, deviation of the actual phase difference characteristic from the predicted (theoretical) phase difference characteristic can be measured. A suitable phase calibrating function may then be applied both to restore the linearity of the phase difference characteristic and to cancel the effects of differences in the receiver/transmitter and path delays. The invention therefore has a self-calibrating capability and will not be nearly as critical in receiver tuning and phase linearity as would otherwise be expected.

Returning now to FIG. 3, the demodulated output signals of receivers 11, 16 and 17 are passed through filter 19, which provides output signals restricted in bandwidth to that which can be subsequently processed by the computer. The output of the filter is applied to computer, 20, which includes an analog-to-digital converter. The input analog signals are therefore digitized and operated upon by a discrete Fourier transformation algorithm within the computer.

The computer used in the aforenoted test of the system was a *VARIAN 73 minicomputer.

*Trademark

The operations described earlier with respect to the signals shown in FIGS. 2a, 2b and 2c are performed and the location of the transmitter in question is determined with respect to the current geometry. The computer is usefully programmed merely to provide location coordinate signals defining the intersection of the two lines 6—6 and 7—7 of FIG. 1.

The location coordinate signal is then applied to a display means for presentation, which typically can be a cathode ray screen, carrying a map of the region, on which the location of the transmitter is designated, a printing device such as a teletypewriter or the like on which the coordinates are printed out in alphanumerics, or on a graphical plotter on which the location of the transmitter which has been located is marked along with background tactical and geographical information. The location signal can also be sent via another communication channel to tactical headquarters.

In operation, the field stations are located in the general environment of the transmitter to be located. A calibration transmitter is positioned at a known location. Time delays resulting from electromagnetic emissions from the test transmitter are determined in the computer and adjusted to force a fixed solution to the actual coordinates of the test transmitter. This provides a calibration for the system in the field. Subsequent computations of the location of unknown targets are therefore related to the measurements on the calibration signal. The calibration would ordinarily be carried out only once for a given field system set-up.

It should be noted that the computer should usefully contain signals stored which restrict the indicated hyperbolic intersection points to predetermined areas or volumes. Where four or more receivers are used, the intersection points can be indicated in three dimensional space. However as there will often be a minimal number of receivers used in the system, prior information as to the expected or general area of the transmitter will often be known, and this will restrict the valid coordinate point to a single one or a small number. For example, if it is known that the transmitter to be located is on the ground, the intersection point would be restricted only to those on a plane approximately coplanar with the surface of the earth. This will restrict the number of hyperbolic points to a small number, i.e. two, for three receivers.

It can be seen that due to the fast operation on the received signals by the Fourier transform, a fix on the transmitter to be located can be determined from only a short burst of emission therefrom, and virtually in real time. A considerably improved tactical tool therefore results.

A person skilled in the art reading this specification may now design alternatives and variations to the preferred embodiment which has been described. All are considered within the scope of this invention, as defined in the appended claims.

The embodiments of the invention in which an exclusive property or privilege is claimed are defined as follows:

1. Apparatus for determining the location of a transmitter comprising:
    (a) receiving means including at least two spaced receivers for receiving electromagnetic radiation from the transmitter,
    (b) means for demodulating said radiation individually from each of said receivers,
    (c) means for Fourier transforming the demodulated radiation from each of said receivers, and for providing signals representative of the radiation as a function of frequency,
    (d) means for performing a complex division of each of said signals, to establish a signal representing the phase difference between the demodulated radiation from each of the signals, and
    (e) means for providing a signal representative of the time difference based on said phase difference for defining a hyperbolic surface of rotation on which the transmitter is located.

2. Apparatus for determining the location of a transmitter as defined in claim 1 further including means for displaying the location of common intersections of a plurality of said hyperbolic surfaces as the locus or possible locii of the transmitter.

3. Apparatus for determining the location of a transmitter as defined in claim 1, in which the receiving means includes at least 3 receivers, further including means for determining the loci of at least two intersecting hyperbolic surfaces from at least two pairs of said receivers, each surface being defined by one of said phase difference signals, and for displaying the intersection coordinates of said surfaces as the location or possible locations of the transmitter.

4. Apparatus for determining the location of a transmitter as defined in claim 1, 2 or 3 further including means for providing signals representing restricted areas or volumes within which the location of the transmitter is to be indicated.

5. Apparatus for determining the location of a transmitter as defined in claim 1, 2 or 3 further including means for providing signals representing a plane area of the surface of the earth to which the indicated intersections of said hyperbolic surfaces are restricted for display.

6. Apparatus for determining the location of a transmitter as defined in claim 3, in which the means for Fourier transforming the demodulated signals, for comparing said signals and for determining said loci and intersection is comprised of a digital computer, said computer having an output connected to a location coordinate display means.

7. Apparatus for determining the location of a transmitter comprising:
    (a) a central station having at least three receivers, one of which is tuneable to the frequency of electromagnetic radiation emitted by said transmitter, each of which is adapted to provide a demodulated output signal,
    (b) a pair of spaced field stations, each of which is comprised of a field receiver tuneable to said frequency of electromagnetic radiation of said transmitter, and of a field transmitter coupled to the associated field receiver, the field transmitters being tuned to frequencies different from the transmitter to be located, and different from each other,
    (c) the individual second and third receivers of the central station being tuned respectively to a respective individual frequency of each of the field transmitters, whereby a burst of electromagnetic energy emitted by the transmitter to be located is received by said one central station receiver and by the pair of field receivers at its emitted frequency, the field transmitters being adapted to retransmit signals representative of said energy on separate frequencies to the second and third central station receivers,
    (d) filter means for receiving the demodulated output signals connected to the central station receivers, for providing narrow band output signals,
    (e) means for digitizing the narrow band output signals,
    (f) computer means for Fourier transforming each of the narrow band output signals, for performing a complex division of pairs of the transformed signals to establish a signal representing the phase difference between said pairs of the narrow band output signals, for providing signals representative of the time difference based on said phase difference for defining hyperbolic surfaces of rotation on which the transmitter is located for pairs of said narrow band output signals, and for providing coordinate signals of the intersection of said hyperbolic surfaces resulting from the time differentials, the coordinate signals being determinative of the possible locations of the transmitter to be located.

8. Apparatus for determining the location of a transmitter as defined in claim 7 in which the computer contains stored signals determinative of limited areas or volumes within which said coordinate signals are restricted.

9. Apparatus for determining the location of a transmitter as defined in claim 6 in which the display means is apparatus selected from the group consisting of a tele-typewriter, a cathode ray screen, and a graphical plotter.

10. Apparatus as defined in claim 6 or 8 comprising at least one additional receiver, the indicated coordinates being provided representative of a three dimensional space.

11. Apparatus as defined in claim 6 or 8, the indicated coordinates being provided representative of a two dimensional plane approximately coplanar with the surface of the earth.

12. Apparatus for determining the location of a transmitter as defined in claim 8, further including display means connected to the computer means for receiving the coordinate signals and visually displaying the coordinates of the transmitter to be located.

13. A method of locating a transmitter comprising:
    (a) receiving transmitted signals from said transmitter at these separated locations,
    (b) demodulating said transmitted signals,
    (c) performing a Fourier transform of each of the demodulated signals to obtain signals representative of their amplitudes as a function of frequency, and their phases as a function of frequency,
    (d) performing a complex division of pairs of said signals representative of their phases as a function of frequency, to obtain signals representative of the phase differences between pairs of said signals, and
    (e) determining and displaying the coordinates of the transmitter at a location at the intersection of a pair of curves, each curve being determined based on time and constant velocity of travel of the transmitted signal related to said phase differences.

* * * * *